United States Patent [19]

Meyer, Jr. et al.

[11] Patent Number: 5,219,941
[45] Date of Patent: Jun. 15, 1993

[54] HIGH IMPACT POLYESTER/ETHYLENE COPOLYMER BLENDS

[75] Inventors: Max F. Meyer, Jr.; Mark E. Stewart; Martin R. Tant, all of Kingsport, Tenn.

[73] Assignee: Eastman Kodak Company, Rochester, N.Y.

[21] Appl. No.: 851,592

[22] Filed: Mar. 16, 1992

[51] Int. Cl.$^5$ .............................................. C08L 67/02
[52] U.S. Cl. ..................................... 525/173; 525/176; 264/328.16; 264/328.17; 524/513
[58] Field of Search ............................... 525/176, 173; 264/328.16, 328.17

[56] References Cited

U.S. PATENT DOCUMENTS

| | | | |
|---|---|---|---|
| 3,562,200 | 2/1971 | Jones et al. | 260/40 |
| 3,578,729 | 5/1971 | Brinkmann | 525/176 |
| 3,580,965 | 5/1971 | Brinkman et al. | 260/873 |
| 4,172,859 | 10/1979 | Epstein | 428/402 |

Primary Examiner—Patricia A. Short
Attorney, Agent, or Firm—John D. Thallemer; William P. Heath, Jr.

[57] ABSTRACT

This invention relates to compositions containing poly(1,4-cyclohexylenedimethylene terephthalate) (PCT) or copolyesters from terephthalic acid, 1,4-cyclohexanedimethanol and ethylene glycol, having improved impact strength at low temperatures due to the presence of an ethylene copolymer which contains repeat units from ethylene and at least 5 mole percent of a free radical polymerizable comonomer selected from the group consisting of vinyl acetate and an alkyl acrylate.

11 Claims, No Drawings

HIGH IMPACT POLYESTER/ETHYLENE COPOLYMER BLENDS

FIELD OF THE INVENTION

This invention relates to polyester/ethylene copolymer blends and processes for preparing the same. More particularly, this invention relates to polyester/ethylene copolymer blends capable of providing molded articles with high notched Izod impact strength at temperatures near 0° C. while maintaining the chemical resistance, abrasion resistance, electrical and mechanical properties normally associated with polyesters. Specifically, the invention is directed to compositions containing poly(1,4-cyclohexylenedimethylene terephthalate) (PCT) or copolyesters from terephthalic acid, 1,4-cyclohexanedimethanol and ethylene glycol, having improved impact strength at low temperatures due to the presence of an ethylene copolymer which contains repeat units from ethylene and at least 5 mole percent of a free radical polymerizable comonomer selected from the group consisting of vinyl acetate and an alkyl acrylate.

BACKGROUND OF THE INVENTION

Thermoplastic polyesters based on terephthalic acid and diols such as ethylene glycol and 1,4-cyclohexanedimethanol have proven to be very desirable for injection molding articles for high strength applications. These polymers show a desirable balance of mechanical, thermal, electrical and rheological properties. However, the use of these polymers is limited where high impact strength at low temperatures is required, especially at temperatures near 0° C. It is, therefore, highly desirable to improve the low temperature impact strength of polyester blends used for injection molding.

Thermoplastic compositions exhibiting high impact strength are found in U.S. Pat. Nos. 3,562,200, 3,580,965 and 4,172,859. U.S. Pat. No. 3,562,200 discloses a thermoplastic composition containing polyethylene terephthalate having finely dispersed discrete particles of an amorphous or poorly crystalline high molecular weight copolymer of ethylene and a carboxylic acid ester. In contrast, the ethylene copolymers of the present invention have a high, degree of crystallinity.

U.S. Pat. No. 3,580,965 discloses thermoplastic molding compositions containing linear, saturated polyesters and 0.05 to 20 weight percent of copolymers of α-olefins and vinyl esters of saturated monocarboxylic acids. While the use of polyethylene terephthalate and polycyclohexane-1,4-dimethylol terephthalate polyesters are disclosed in U.S. Pat. No. 3,580,965, such patent does not suggest the possibility of obtaining unexpected results from a polyester containing a combination of ethylene glycol and 1,4-cyclohexanedimethanol. In fact, the present inventors have discovered that the notched Izod impact strength at 0° C. of neat polyethylene terephthalate is not effectively improved by the addition of copolymers of ethylene with vinyl acetate.

U.S. Pat. No. 4,172,859 discloses multi phase thermoplastic compositions containing a polyester, a copolyester with polycarbonate and at least one other phase containing a wide range of copolymers. Copolymers of ethylene and vinyl acetate, which are necessary in the present invention, are excluded from a long list of useful copolymers for toughening polyester in U.S. Pat. No. 4,172,859. In such patent, ethylene and vinyl acetate are only present in the form of a terpolymer with, for example, carbon monoxide. In addition, U.S. Pat. No. 4,172,859 states that the particle size of the copolymers must be in the range of 0.01 to 3.0 microns to achieve high impact strength. In contrast, the particle size of the copolymers of the present invention approach co continuous phases.

SUMMARY OF THE INVENTION

Accordingly, one object of the present invention is to provide thermoplastic molding compositions having significantly improved high notched Izod impact strength at temperatures near 0° C.

Another object of the invention is to provide polyester/ethylene copolymer blends which exhibit excellent mechanical properties such as impact resistance, stress crack resistance and heat resistance, and which display excellent melt flowability at the time of molding thereof, and to provide processes for preparing said blends.

These and other objects are accomplished herein by a thermoplastic molding composition comprising:

(A) about 60 to about 85 weight percent of a polyester which comprises (1) a dicarboxylic acid component consisting essentially of repeat units from terephthalic acid, and (2) a diol component consisting essentially of repeat units from about 15 to 100 mole percent 1,4-cyclohexanedimethanol and from 0 to about 85 mole percent ethylene glycol, based on 100 mole percent dicarboxylic acid and 100 mole percent diol, said polyester having an inherent viscosity of about 0.4 to about 1.5 dl/g; and (B) about 15 to about 40 weight percent of an ethylene copolymer containing repeat units from ethylene and at least 5 mole percent of a free radical polymerizable comonomer selected from the group consisting of vinyl acetate and an alkyl acrylate of the formula

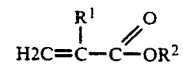

wherein $R^1$ is hydrogen or a methyl radical, and $R^2$ is a monovalent hydrocarbon radical having from 1 to 8 carbon atoms;

it being understood that the combined weights of (A) and (B) total 100 percent.

DESCRIPTION OF THE INVENTION

Component (A) of the present invention is a polyester which contains repeat units from mixtures of terephthalic acid, 1,4-cyclohexanedimethanol and ethylene glycol, based on 100 mole percent dicarboxylic acid and 100 mole percent diol. The dicarboxylic acid component of the polyester (A) consists essentially of repeat units from terephthalic acid. The diol component of the polyester consists essentially of about 15 to 100 weight percent 1,4-cyclohexanedimethanol and 0 to about 85 weight percent ethylene glycol. Preferably, the diol portion consists of 20 to 70 weight percent ethylene glycol and 80 to 30 weight percent 1,4-cyclohexanedimethanol. The term "consists essentially of" means that in addition to the terephthalic acid, 1,4-cyclohexanedimethanol and ethylene glycol, other dicarboxylic acids and diols may be present in the polyester provided that the basic and essential characteristics of the polyester are not materially affected thereby.

For example, the polyester, component (A), may optionally be modified with up to about 3 mole percent, based on 100 mole percent dicarboxylic acid, of one or more different dicarboxylic acids other than terephthalic acid or suitable synthetic equivalents. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene 2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like.

In addition, the polyester may optionally be modified with up to about 3 mole percent, based on 100 mole percent diol, of one or more different diols other than 1,4-cyclohexanedimethanol and ethylene glycol. Such additional diols include cycloaliphatic diols preferably having 6 to 15 carbon atoms or aliphatic diols preferably having 3 to 8 carbon atoms. Examples of such diols to be included with 1,4-cyclohexanedimethanol and ethylene glycol are: propane-1,3-diol, butane-1,4-diol, pentane-1,5-diol, hexane-1,6-diol, 3-methylpentanediol (2,4), 2-methylpentanediol (1,4), 2,2,4-trimethylpentane diol (1,3), 2-ethylhexanediol-(1,3), 2,2-diethylpropane diol-(1,3), hexanediol-(1,3), 1,4-di-(hydroxyethoxy) benzene, 2,2-bis-(4-hydroxycyclohexyl)-propane, 2,4-dihydroxy-1,1,3,3-tetramethyl cyclobutane, 2,2-bis (3-hydroxyethoxyphenyl)-propane, 2,2-bis (4-hydroxypropoxyphenyl)-propane, and the like.

Polyesters useful as component (A) have an inherent viscosity of about 0.4 to about 1.5 dl/g. Preferably, the polyesters have an inherent viscosity of 0.5 to 1.1 dl/g. Polyesters comprising substantially only 1,4-cyclohexanedimethanol, ethylene glycol and terephthalic acid are preferred for use in the present invention since such polyesters when molded exhibit the greatest impact strengths at low temperatures.

The polyesters useful in the invention can be prepared by conventional polycondensation procedures well known in the art. Such processes include direct condensation of the acid with the glycol or by ester interchange using lower alkyl esters. The essential components of the polyesters; e.g., terephthalic acid or dimethyl terephthalate, 1,4-cyclohexanedimethanol and ethylene glycol are commercially available.

The second component (B) of the invention is a ethylene copolymer which contains repeat units from ethylene and at least 5 mole percent of a free radical polymerizable comonomer selected from the group consisting of vinyl acetate and an alkyl acrylate of the formula

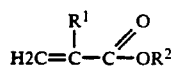

wherein $R^1$ is hydrogen or a methyl radical, and $R^2$ is a monovalent hydrocarbon radical having from 1 to 8 carbon atoms. The ethylene copolymer is present in an amount of from about 15 to about 40 weight percent of the composition. Preferably, the ethylene copolymer is present in an amount of from 21 to 35 weight percent of the composition. The ethylene copolymer has a Stiffness value of less than 68.9 MPa as determined by ASTM-D747, and a Melt Index value of 1 to 100 measured at 190° C., as determined by ASTM D1238. The Melt Index value is preferably 5 to 70 when measured at 190° C. The ethylene copolymer may be dispersed in the polyester matrix as very small particles, 0.1 to 10 microns, or as co-continuous phases.

The ethylene copolymer, component (B), may be prepared by free radical initiated processes well known in the art. The ethylene copolymer should have glass transition temperature (Tg) less than 0° C. and preferably less than −20° C. The ethylene copolymers exhibit easily detectable crystalline melting points and endotherms of at least 1 cal/g as determined by differential scanning calorimetry (DSC) on material quenched from the melt and heated at 20° C./min. Such properties indicate significant levels of crystallinity present in the ethylene copolymers. In addition, the ethylene copolymers have heat of crystallization exotherms of from about 3 to about 14.8 cal/g upon cooling at 20° C./min.

Many other ingredients can be added to the compositions of the present invention to enhance the performance properties of the blends. For example, antioxidants, metal deactivators, colorants, phosphate stabilizers, mold release agents, fillers, nucleating agents, ultraviolet light and heat stabilizers, lubricants, flame retardants and the like, can be included herein. All of these additives and the use thereof are well known in the art and do not require extensive discussions. Therefore, only a limited number will be referred to, it being understood that any of these compounds can be used so long as they do not hinder the present invention from accomplishing its objects.

Examples of typical commercially available antioxidants useful in this invention include, but are not limited to, hindered phenols, phosphites, diphosphites, polyphosphites, and mixtures thereof. Combinations of aromatic and aliphatic phosphite compounds may also be included.

Flame retardants may also be included as an additive in the present invention. A preferred flame retardant is a mixture which contains an aromatic organic compound having at least one aromatic ring having halogen bonded directly to the aromatic ring. Representative of such flame retardant compounds are decabromodiphenyl ether, octabromodiphenyl ether, ethylene bis(tetrabromophthalimide), brominated polystyrene, poly(dibromophenylene oxide), a condensation product of two moles of tetrachlorocyclopentadiene and one mole of cyclooctadiene, and the like. The flame retarding mixture further contains an antimony compound such as antimony oxide, antimony trioxide, sodium antimonate and powdered antimony.

The process for preparing the polyester/copolymer blends of the present invention involve preparing the polyester and ethylene copolymer, respectively, by processes as mentioned previously. The polyester and ethylene copolymer are dried in an atmosphere of dried air or dried nitrogen, or under reduced pressure. The polyester and ethylene copolymer are mixed and subsequently melt compounded, for example, in a single or twin screw extruder. Melt temperatures must be at least as high as the melting point of the polyester component or sufficiently above the glass transition temperature for an amorphous polyester, which typically is in the range of 260°-310° C. Preferably, the melt compounding temperature is maintained as low as possible within said range. After completion of the melt compounding, the extrudate is withdrawn in strand form, and recovered according to the usual way such as cutting.

The range of composition of the blends is from about 60 to about 85 weight percent polyester and from about 15 to about 40 weight percent of ethylene copolymer. The preferred compositional range is from 65 to 79 weight percent polyester and from 21 to 35 weight percent ethylene copolymer.

The blends of this invention serve as excellent starting materials for the production of moldings of all types by injection molding. Specific applications include medical parts, appliance parts, automotive parts, housings, recreational and utility parts. The molding compositions of the present invention are especially useful in applications that require toughness in hard to fill injection molded parts.

The materials and testing procedures used for the results shown herein are as follows:

Inherent viscosity (I.V.) was measured at 23° C. using 0.50 grams of polymer per 100 mL of a solvent consisting of 60% by weight phenol and 40% by weight tetrachloroethane.

Izod Impact Strength: ASTM-D256
Stiffness: ASTM-D747
Melt Index: ASTM-D1238

The following copolymers, component (B), were used in the examples:

Copolymer A consists of 82% by weight ethylene and 18% by weight ethyl acrylate with a mole ratio of 94.2:5.8. Copolymer A was dried at 23° C. with a nitrogen purge and tumbling for 16 hours.

Copolymer B consists of 82% by weight ethylene and 18% by weight ethyl acrylate with a mole ratio of 94.2:5.8. Copolymer B was dried at 23° C. with a nitrogen purge and tumbling for 16 hours.

Copolymer C consists of 80% by weight ethylene and 20% by weight methyl acrylate with a mole ratio of 92.5:7.5. Copolymer C was dried at 23° C. with a nitrogen purge and tumbling for 16 hours.

Copolymer D consists of 85% by weight ethylene and 15% by weight vinyl acetate with a mole ratio of 94.6:5.4. Copolymer D was dried at 23° C. with a nitrogen purge and tumbling for 16 hours.

Copolymer E consists of 72% by weight ethylene and 28% by weight vinyl acetate with a mole ratio of 88.8:11.2. Copolymer E as dried at 23° C. with a nitrogen purge and tumbling for 16 hours.

Copolymer F consists of 60% by weight ethylene and 40% by weight vinyl acetate with a mole ratio of 82.2:17.8. Copolymer F was dried at 23° C. with a nitrogen purge and tumbling for 16 hours.

| Physical data of Copolymers A-F was as follows: | | | | | | |
|---|---|---|---|---|---|---|
| Copolymer | A | B | C | D | E | F |
| Melt Index (g/10 min) | 6 | 20 | 6 | 8 | 6 | 60 |
| DSC (2nd cycle) | | | | | | |
| Tg °C. | −67 | | | | −68 | −19 |
| Tm °C. | 105 | 103 | 87 | 95 | 74 | 52 |
| H$_f$ cal/g | 30.7 | 36.6 | 23.3 | 27.8 | 20.5 | 1.0 |
| Tcc °C. | 76 | 74 | 61 | 71 | 49 | 88 |
| H$_{cc}$ cal/g | 11.6 | 10.6 | 10.7 | 14.8 | 8.8 | 3.3 |
| Stiffness | 62.0 | 53.7 | 44.8 | 65.5 | 28.2 | 4.1 |

| -continued | | | | | | |
|---|---|---|---|---|---|---|
| Physical data of Copolymers A-F was as follows: | | | | | | |
| Copolymer | A | B | C | D | E | F |
| (MPa) | | | | | | |

H$_f$—melting endotherm upon heating quenched sample at 20° C./min.
H$_{cc}$—crystallization exotherm on cooling from melt at 20° C./min.
Tm—melting point.
Tg—glass transition temperature.
Tcc—temperature of exotherm peak upon cooling The invention will be further illustrated by a consideration of the following examples, which are intended to be exemplary of the invention. All parts and percentages in the examples are on a weight basis unless otherwise stated.

EXAMPLE 1

A polyester consisting of 100 mole percent terephthalic acid, and 100 mole percent ethylene glycol, designated as PET, with an I.V. of 0.70, was dried at 110° C. for 16 hours in dehumidified air. The polyester was extruded using a 1.5 inch (3.85 cm) Sterling single screw extruder (L/D=36/1) at a set temperature of 260° C. The extrudate was chopped into pellets which were dried at 100° C. for 16 hours in dehumidified air, and injection molded into tensile and flexural bars using a Toyo 90G injection molding machine having a mold cavity temperature of 23° C. The test results are summarized in Table I.

EXAMPLES 2-9

The polyester used in Example 1 was mixed by tumbling and rotating in a polyethylene bag with 10 to 30 weight percent of Copolymers A-F. The mixture was melt blended and molded as in Example 1. The weight percents of the copolymers used in each example and test results are summarized in Table I.

In Table I, the Izod Impact Strength Test was repeated five times for each example. The letter C under impact strength indicates a complete break and indicates brittle failure.

TABLE I

| Blends of PET with Ethylene Copolymers A-F | | | |
|---|---|---|---|
| Example | Ethylene Copolymer | Ethylene Copolymer (wt %) | Notched Izod Impact Strength at 0° C.(J/m)/(ft-lb/in) |
| 1 | — | — | 37.4/0.7 5C |
| 2 | A | 10 | 37.4/0.7 5C |
| 3 | A | 20 | 58.7/1.1 5C |
| 4 | A | 30 | 117.5/2.2 5C |
| 5 | B | 20 | 48.1/0.9 5C |
| 6 | C | 20 | 37.4/0.7 5C |
| 7 | D | 20 | 42.7/0.8 5C |
| 8 | E | 20 | 64.1/1.2 5C |
| 9 | F | 20 | 101.5/1.9 5C |

The results in Table I indicate that blends of polyethylene terephthalate with Copolymers A through F exhibit little or no improvement in impact strength at 0° C. over polyethylene terephthalate without the copolymers.

EXAMPLE 10

Polyester I consisting of 100 mole percent terephthalic acid, 69 mole percent ethylene glycol and 31 mole percent 1,4-cyclohexanedimethanol with an I.V. of 0.75, was dried at 60° C. for 16 hours in dehumidified air. Polyester I was extruded using a 1.5 inch (3.85 cm) Sterling single screw extruder (L/D=36/1) at a set temperature of 250° C. The extrudate was chopped into pellets which were dried at 100° C. for 16 hours in dehumidified air, and injection molded into tensile and flexural bars using a Toyo 90G injection molding machine having a mold cavity temperature of 23° C. The test results are summarized in Table II.

EXAMPLES 11-24

Polyester I was mixed by tumbling and rotating in a polyethylene bag with 10 to 30 weight percent of Copolymers A-F. The mixture was melt blended and molded as in Example 10. The weight percents of the copolymers used in each example and test results are summarized in Table II.

In Table II, the Izod Impact Strength Test was repeated three to five times for each example. The letters C, P and N under impact strength have the following meanings:

C—complete break, brittle failure
P—partial break
N—no break, ductile failure

TABLE II

Blends of Polyester I with Ethylene Copolymers A-F

| Example | Ethylene Copolymer | Ethylene Copolymer (wt %) | Notched Izod Impact Strength at 0° C.(J/m)/(ft-lb/in) | |
|---|---|---|---|---|
| 10 | — | — | 58.7/1.1 | 5C |
| 11 | A | 10 | 80.1/1.5 | 5C |
| 12 | A | 20 | 453.9/8.5 | 3C |
| 13 | A | 30 | 907.8/17.0 | 1C, 2N |
| 14 | B | 20 | 277.7/5.2 | 5C |
| 15 | C | 20 | 277.7/5.2 | 4C, 1P |
| 16 | D | 10 | 69.4/1.3 | 5C |
| 17 | D | 20 | 90.8/1.7 | 5C |
| 18 | D | 30 | 427.2/8.0 | 3P, 2P |
| 19 | E | 10 | 80.1/1.5 | 5C |
| 20 | E | 20 | 149.5/2.8 | 5C |
| 21 | E | 30 | 1068.0/20.0 | 5N |
| 22 | F | 10 | 133.5/2.5 | 5C |
| 23 | F | 20 | 534.0/10.0 | 3C, 2N |
| 24 | F | 30 | 1068.0/20.0 | 5N |

The results in Table II indicate that blends of Polyester I with Copolymers A through F exhibit significant increases in impact strength at 0° C. over the Polyester alone and the polyethylene terephthalate examples (Ex. 1-9). Moreover, the mode of impact failure for many of such blends was changed from brittle to ductile. These results are achieved where Copolymers A-F are used within the critical range of 20 to 40 weight percent.

EXAMPLE 25

Polyester II consisting of 100 mole percent terephthalic acid, 66 mole percent 1,4-cyclohexanedimethanol and 34 mole percent ethylene glycol with an I.V. of 0.75, was dried at 60° C. for 16 hours in dehumidified air. Polyester II was extruded using a 1.5 inch (3.85 cm) Sterling single screw extruder (L/D=36/1) at a set temperature of 265° C. The extrudate was chopped into pellets which were dried at 100° C. for 16 hours in dehumidified air, and injection molded into tensile and flexural bars using a Toyo 90G injection molding machine having a mold cavity temperature of 23° C. The test results are summarized in Table III.

EXAMPLES 26-33

Polyester II was mixed by tumbling and rotating in a polyethylene bag with 10 to 30 weight percent of Copolymers A-F. The mixture was melt blended and molded as in Example 25. The weight percents of the copolymers used in each example and test results are summarized in Table III.

In Table III, the Izod Impact Strength Test was repeated four to five times for each example. The letters C and N under impact strength have the following meanings:

C—complete break, brittle failure
N—no break, ductile failure

TABLE III

Blends of Polyester II with Ethylene Copolymers A-F

| Example | Ethylene Copolymer | Ethylene Copolymer (wt %) | Notched Izod Impact Strength at 0° C.(J/m)/(ft-lb/in) | |
|---|---|---|---|---|
| 25 | — | — | 106.8/2.0 | 5C |
| 26 | A | 10 | 144.2/2.7 | 5C |
| 27 | A | 20 | 763.6/14.3 | 1C, 3N |
| 28 | A | 30 | 1009.3/18.9 | 5N |
| 29 | B | 20 | 502.0/9.4 | 3C, 2N |
| 30 | C | 20 | 197.6/3.7 | 5C |
| 31 | D | 20 | 854.4/16.0 | 5N |
| 32 | E | 20 | 154.9/2.9 | 5C |
| 33 | F | 20 | 726.2/13.6 | 1C, 3N |

The results in Table III indicate that blends of Polyester II with Copolymers A through F exhibit significant increases in impact strength at 0° C. over the Polyester alone and the polyethylene terephthalate examples (Ex. 1-9). Moreover, the mode of impact failure for many of such blends was changed from brittle to ductile. These results are achieved where Copolymers A-F are used within the critical range of 20 to 40 weight percent.

EXAMPLE 34

A polyester consisting of 100 mole percent terephthalic acid, and 100 mole percent 1,4-cyclohexanedimethanol, designated as PCT, with an I.V. of 0.75 and a melting point of 295° C., was dried at 110° C. for 16 hours in dehumidified air. The polyester was melt blended using a 1.5 inch (3.85) Sterling single screw extruder (L/D=36/1) at a set temperature of 295° C. The extrudate was chopped into pellets which were dried at 100° C. for 16 hours in dehumidified air, and injection molded into tensile and flexural bars using a Toyo 90G injection molding machine having a mold cavity temperature of 23° C. The test results are summarized in Table IV.

EXAMPLE 35-41

The polyester used in Example 34 was mixed by tumbling and rotating in a polyethylene bag with 10 to 30 weight percent of Copolymers A-F. The mixture was melt blended and molded as in Example 34. The weight percents of the copolymers used in each example and test results are summarized in Table IV.

In Table IV, the Izod Impact Strength Test was repeated four to five times for each example. The letters C, P and N under impact strength have the following meanings:

C—complete break, brittle failure
P—partial break
N—no break, ductile failure

TABLE IV

Blends of PCT with Ethylene Copolymers A-F

| Example | Ethylene Copolymer | Ethylene Copolymer (wt %) | Notched Izod Impact Strength at 0° C.(J/m)/(ft-lb/in) | |
|---|---|---|---|---|
| 34 | — | — | 48.1/0.9 | 5C |
| 35 | A | 10 | 101.5/1.9 | 4C |

TABLE IV-continued

<table>
<tr><td colspan="4">Blends of PCT with Ethylene Copolymers A-F</td></tr>
<tr><td>Example</td><td>Ethylene Copolymer</td><td>Ethylene Copolymer (wt %)</td><td>Notched Izod Impact Strength at 0° C.(J/m)/(ft-lb/in)</td></tr>
<tr><td>36</td><td>A</td><td>20</td><td>213.6/4.0  4C, 1P</td></tr>
<tr><td>37</td><td>A</td><td>30</td><td>224.3/4.2  5P</td></tr>
<tr><td>38</td><td>B</td><td>20</td><td>181.6/3.4  3C, 2N</td></tr>
<tr><td>39</td><td>D</td><td>20</td><td>85.4/1.6  5C</td></tr>
<tr><td>40</td><td>E</td><td>20</td><td>117.5/2.2  5C</td></tr>
<tr><td>41</td><td>F</td><td>20</td><td>181.6/3.4  5C</td></tr>
</table>

The results in Table IV indicate poly(1,4-cyclohexylenedimethylene terephthalate) with Copolymers A through F exhibit significant increases in impact strength at 0° C. over the PCT resin alone and the polyethylene terephthalate examples (Ex. 1–9), in spite of the fact that the PCT resin is crystalline to some degree. Moreover, the mode of impact failure for many of such blends was changed from brittle to ductile. These results are achieved where Copolymers A–F are used within the critical range of 20 to 40 weight percent.

Many variations will suggest themselves to those skilled in this art in light of the above detailed description. All such obvious modifications are within the full intended scope of the appended claims.

What is claimed is:

1. A thermoplastic molding composition comprising:
   (A) about 60 to about 85 weight percent based on the total weight of (A) and (B) of a polyester which comprises
      (1) a dicarboxylic acid component consisting essentially of repeat units from terephthalic acid, and
      (2) a diol component consisting essentially of repeat units from about 15 to 100 mole percent 1,4-cyclohexanedimethanol and from 0 to about 85 mole percent ethylene glycol, based on 100 mole percent dicarboxylic acid and 100 mole percent diol, said polyester having an inherent viscosity of about 0.4 to about 1.5 dl/g; and
   (B) about 15 to about 40 weight percent based on the total weight of (A) and (B) of an ethylene copolymer containing repeat units from ethylene and at least 5 mole percent of a free radical polymerizable comonomer selected from the group consisting of vinyl acetate and an alkyl acrylate of the formula

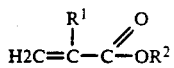

wherein
   $R^1$ is hydrogen or a methyl radical, and
   $R^2$ is a monovalent hydrocarbon radical having from 1 to 8 carbon atoms; provided that the ethylene copolymer has a stiffness value of less than 68.9 MPa as determined by ASTM D747, and a melt index of 1 to 100 measured at 190° C., as determined by ASTM-D1238.

2. The composition according to claim 1 wherein the polyester, component (A), has an inherent viscosity of 0.5 to 1.1 dl/g, wherein the inherent viscosity is determined at 25° C. in 60/40 (wt./wt.) phenol/tetrachloroethane at a concentration of 0.5 g/100 ml.

3. The composition according to claim 1 wherein component (A) is present in an amount of from 65 to 79 weight percent and component (B) is present in an amount of from 21 to 35 weight percent based on the total weight of the composition.

4. The composition according to claim 1 wherein the polyester, component (A), has an acid component of about 100 mole percent from terephthalic acid; and has a diol component of about 65 to about 75 mole percent from ethylene glycol and about 25 to about 35 mole percent from 1,4-cylohexanedimethanol.

5. The composition according to claim 1 wherein the polyester, component (A), has an acid component of about 100 mole percent from terephthalic acid; and has a diol component of about 30 to about 40 mole percent from ethylene glycol and about 60 to about 70 mole percent from 1,4-cylohexanedimethanol.

6. The composition according to claim 1, further comprising an additive selected from the group consisting of colorants, mold release agents, antioxidants, tougheners, nucleating agents, ultraviolet light and heat stabilizers, lubricants, and processing aids.

7. A molded article comprising the composition of claim 1.

8. A thermoplastic molding composition comprising:
   (A) about 60 to about 85 weight percent based on the total weight of (A) and (B) of a polyester which comprises
      (1) a dicarboxylic acid component consisting essentially of repeat units from terephthalic acid, and
      (2) a diol component consisting essentially of repeat units from about 15 to about 99.5 mole percent 1,4-cyclohexanedimethanol and from about 0.5 to about 85 mole percent ethylene glycol, based on 100 mole percent dicarboxylic acid and 100 mole percent diol, said polyester having an inherent viscosity of about 0.4 to about 1.5 dl/g; and
   (B) about 15 to about 40 weight percent based on the total weight of (A) and (B) of an ethylene copolymer containing repeat units from ethylene and at least 5 mole percent of a free radical polymerizable comonomer selected from the group consisting of vinyl acetate and an alkyl acrylate of the formula

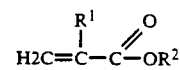

wherein
   $R^1$ is hydrogen or a methyl radical, and
   $R^2$ is a monovalent hydrocarbon radical having from 1 to 8 carbon atoms; provided that the ethylene copolymer has a stiffness value of less than 68.9 MPa as determined by ASTM D747, and a melt index of 1 to 100 measured at 190° C., as determined by ASTM-D1238.

9. A molded article comprising the composition of claim 8.

10. A process for preparing a thermoplastic molding composition having improved high notched Izod impact strength at a temperature near 0° C., said process comprising the steps of:
   (I) substantially homogeneously blending
      (A) about 60 to about 85 weight percent based on the total weight of (A) and (B) of a polyester which comprises
         (1) a dicarboxylic acid component consisting essentially of repeat units from terephthalic acid, and
         (2) a diol component consisting essentially of repeat units from about 15 to 100 mole percent 1,4-cyclohexanedimethanol and from 0 to about 85 mole percent ethylene glycol, based on 100 mole percent dicarboxylic acid and 100 mole percent diol, said polyester having an inherent viscosity of about 0.4 to about 1.5 dl/g; and (B) about 15 to about 40 weight percent based on the total weight of (A) and (B) of an ethylene copolymer containing repeat units from ethylene and at least 5 mole percent of a free radical polymerizable comonomer selected from the group consisting of vinyl acetate and an alkyl acrylate of the formula

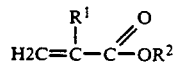

wherein $R^1$ is hydrogen or a methyl radical, and $R^2$ is a monovalent hydrocarbon radical having from 1 to 8 carbon atoms; provided that the ethylene copolymer has a stiffness value of less than 68.9 MPa as determined by ASTM D747, and a melt index of 1 to 100 measured at 190° C., as determined by ASTM-D1238; and (II) injection molding said blend at melt temperatures of about 250° C. to about 325° C. into molds held at a temperature of about 0° C. to about 90° C.

11. The product of the process of claim 10.

* * * * *